(12) United States Patent
Lim

(10) Patent No.: US 11,028,919 B2
(45) Date of Patent: Jun. 8, 2021

(54) APPARATUS AND METHOD FOR CONTROLLING SHIFTING OF A VEHICLE

(71) Applicants: Hyundai Motor Company, Seoul (KR); Kia Motors Corporation, Seoul (KR)

(72) Inventor: Hyun Woo Lim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/814,565

(22) Filed: Mar. 10, 2020

(65) Prior Publication Data

US 2021/0131556 A1  May 6, 2021

(30) Foreign Application Priority Data

Nov. 4, 2019 (KR) .................. 10-2019-0139698

(51) Int. Cl.
  *F16H 59/02* (2006.01)
  *F16H 59/36* (2006.01)
  *F16H 63/02* (2006.01)

(52) U.S. Cl.
  CPC ..... *F16H 59/36* (2013.01); *F16H 2059/0221* (2013.01); *F16H 2059/366* (2013.01); *F16H 2063/025* (2013.01)

(58) Field of Classification Search
  CPC .. F16H 59/02; F16H 59/36; F16H 2059/0221; F16H 2059/366; F16H 2059/0256; F16H 2059/088; F16H 2063/025; F16H 2306/42; F16H 2312/09; B60W 10/02; B60W 10/08; B60W 20/30; B60W 30/18036; B60W 30/18045
  See application file for complete search history.

(56) References Cited

U.S. PATENT DOCUMENTS

| | | | |
|---|---|---|---|
| 7,597,020 B2 | 10/2009 | Baldwin | |
| 2003/0225498 A1* | 12/2003 | Runde | F16H 59/36 701/51 |
| 2007/0056784 A1* | 3/2007 | Joe | B60W 20/30 180/65.245 |
| 2015/0258983 A1* | 9/2015 | Kimura | F16H 3/728 701/22 |
| 2018/0326988 A1* | 11/2018 | Lechlitner | B60K 6/442 |
| 2020/0123740 A1* | 4/2020 | Oasa | E02F 9/2292 |
| 2020/0370646 A1* | 11/2020 | Trinh | F16H 63/304 |

FOREIGN PATENT DOCUMENTS

| | | |
|---|---|---|
| KR | 101887777 B1 | 8/2018 |
| KR | 20190078413 A | 7/2019 |

* cited by examiner

*Primary Examiner* — Edwin A Young
(74) *Attorney, Agent, or Firm* — Slater Matsil, LLP

(57) ABSTRACT

An apparatus and a method for controlling shifting of a vehicle are provided. The apparatus includes a transmission configured to transmit power generated from by a motor to a vehicle wheel, and a controller configured to control an operation of the transmission. The controller is configured to enter a LURCH control mode when sensing shifting of a shift lever between a D range and an R range during driving to maintain a clutch torque in the transmission, to decrease a vehicle speed by controlling a motor speed, and to shift a gear of the vehicle by changing a motor torque when the vehicle speed reaches a threshold speed.

20 Claims, 5 Drawing Sheets

APPARATUS AND METHOD FOR CONTROLLING SHIFTING OF A VEHICLE

CROSS-REFERENCE TO RELATED APPLICATIONS

This application claims priority to Korean Patent Application No. 10-2019-0139698, filed in the Korean Intellectual Property Office on Nov. 4, 2019, which application is hereby incorporated herein by reference.

TECHNICAL FIELD

The present disclosure relates to an apparatus and a method for controlling shifting of a vehicle.

BACKGROUND

Recently, a double clutch transmission (DCT), which has been mounted in various vehicles, has been manufactured by combining fuel efficiency performance of a manual transmission with driving convenience of an automatic transmission. The DCT is largely divided into a dry DCT and a wet DCT. The dry DCT cools a DCT clutch through air cooling and has no separate delivery fluid. Therefore, the dry DCT is weak for heat and delivers impact to the entire portion of the vehicle even if a smaller impact is applied. Meanwhile, the wet DCT has resistance against heat since the DCT clutch is operated inside the clutch oil, but represents inferior transmission efficiency and represents various transmission performances depending on the characteristics of the working fluid. Therefore, the vehicle employing the DCT is able to transmit power when gear-shifted, so the reaction speed is lower than the automatic transmission and control of the vehicle speed for the entrance into DR/RD LURCH (shifting to a reverse (R) gear during driving at a drive (D) gear or shifting to the D gear during driving at the R gear) is limited.

SUMMARY

Embodiments of the present disclosure can solve the above-mentioned problems occurring in the prior art while advantages achieved by the prior art are maintained intact.

An embodiment of the present disclosure provides an apparatus and a method for controlling shifting of a vehicle, capable of rapidly controlling DR LURCH or RD LURCH by removing an R gear from the DCT.

The technical problems to be solved by embodiments of the present inventive concept are not limited to the aforementioned problems, and any other technical problems not mentioned herein will be clearly understood from the following description by those skilled in the art to which the present disclosure pertains.

According to an embodiment of the present disclosure, an apparatus for controlling shifting of a vehicle includes a transmission to transmit power generated from a motor to a vehicle wheel, and a controller to control an operation of the transmission. The controller enters a LURCH control mode when sensing shifting of a shift lever between a D range and an R range during driving to maintain a clutch torque in the transmission, to decrease a vehicle speed by controlling a motor speed, and to shift a gear of the vehicle by changing a motor torque when the vehicle speed reaches a threshold speed.

The controller recognizes DR shifting of the shift lever through a shift lever position sensor, when a position of the shift lever is shifted from the D range to the R range during forward driving with a first gear or a second gear.

The controller recognizes RD shifting of the shift lever through a shift lever position sensor, when a position of the shift lever is shifted from the R range to the D range during rearward driving.

The controller determines the entrance into the LURCH control mode based on a holding time and the vehicle speed after changing a position of the shift lever.

The controller maintains a motor torque before changing the position of the shift lever when the vehicle speed is decreased.

The controller changes a rotational direction of the motor to a direction opposite a present rotational direction through torque intervention control when the vehicle speed reaches the threshold speed.

The transmission includes a Double Clutch Transmission (DCT) including a first clutch to transmit the power to a first transmission input shaft engaged with an odd-numbered gear and a second clutch to transmit the power to a second transmission input shaft engaged with an even-numbered gear.

The controller maintains a clutch torque of the first clutch or the second clutch, which is being driven, inside the transmission when entering the LURCH control mode.

According to another embodiment of the present disclosure, a method for controlling shifting of a vehicle includes entering a LURCH control mode when sensing shifting of a shift lever between a D range and an R range during driving, maintaining a clutch torque in a transmission when entering the LURCH control mode to decrease a vehicle speed by controlling a motor speed, and shifting a gear of the vehicle by changing a motor torque when the vehicle speed reaches a threshold speed.

Entering the LURCH control mode includes sensing shift in a position of the shift lever through a shift lever position sensor, and determining whether to perform LURCH control based on a holding time and the vehicle speed, after shifting the position of the shift lever.

In an embodiment, sensing the shift in the position of the shift lever includes recognizing DR shifting of the shift lever through a shift lever position sensor, when the position of the shift lever is shifted from the D range to the R range during forward driving with a first gear or a second gear.

In an embodiment, sensing the shift in the position of the shift lever includes recognizing RD shifting of the shift lever through a shift lever position sensor, when a position of the shift lever is shifted from the R range to the D range during rearward driving.

Decreasing the vehicle speed includes maintaining a motor torque before shifting the position of the shift lever to reduce the motor speed such that the vehicle speed is deceased.

Shifting the gear of the vehicle includes changing a rotational direction of the motor to a direction opposite a present rotational direction through torque intervention control when the vehicle speed reaches the threshold speed.

The method further includes increasing the vehicle speed by accelerating the motor speed after changing the motor torque.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION OF ILLUSTRATIVE EMBODIMENTS

Figure 1:
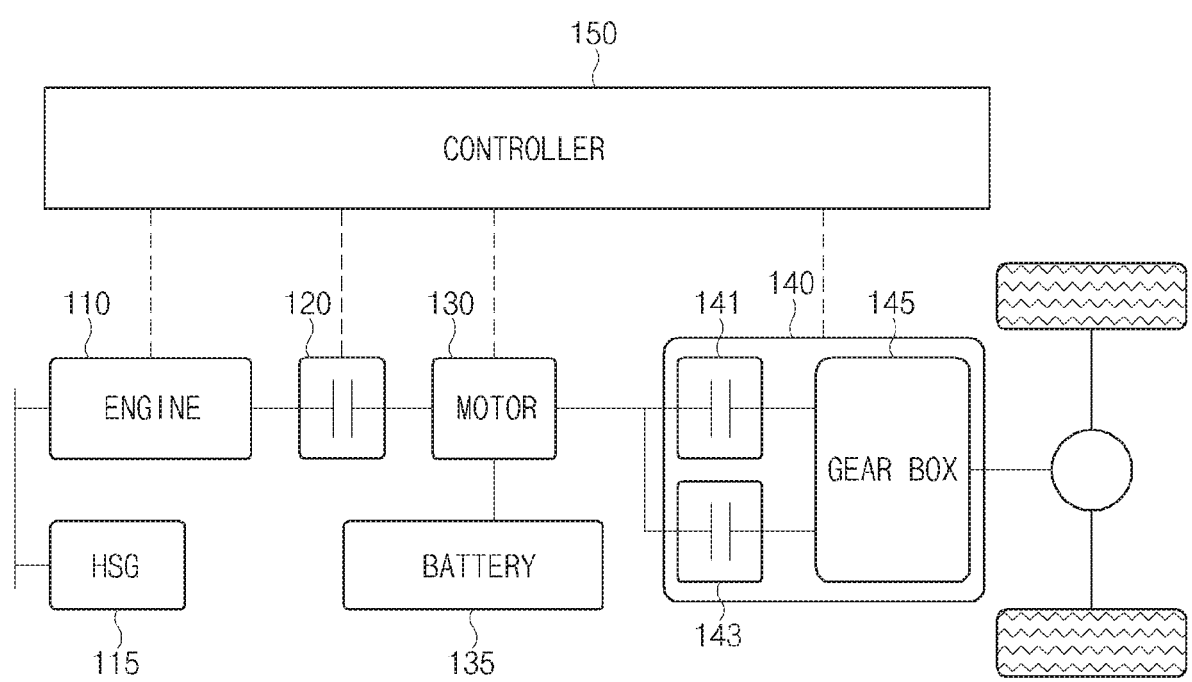
FIG. 1 is a view illustrating the configuration of an apparatus for controlling shifting of a vehicle, according to an embodiment of the present disclosure.

Hereinafter, some embodiments of the present disclosure will be described in detail with reference to accompanying drawings. In adding the reference numerals to the components of each drawing, it should be noted that the identical or equivalent component is designated by the identical numeral even when they are displayed on other drawings. In addition, in the following description of an embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Embodiments of the present disclosure relate to a technology for controlling shifting of a vehicle, the technology being capable of shifting a gear from a forward (D gear) stage to a reverse (R gear) stage or from the reverse stage to the forward stage by changing a rotational direction of a motor instead of shifting the gear from a forward first stage or a forward second stage.

FIG. 1 is a view illustrating the configuration of an apparatus for controlling shifting of a vehicle, according to an embodiment of the present disclosure. In this case, the vehicle is a hybrid electric vehicle (HEV) and/or a plug-in hybrid electric vehicle (PHEV) including a Transmission Mounted Electric Device (TMED) to which a DCT transmission is applied.

Referring to FIG. 1, an apparatus for controlling shifting of a vehicle includes an engine 110, an engine clutch 120, a motor 130, a transmission 140, and a controller 150.

The engine 110 generates power necessary to drive the vehicle by combusting fuel. The engine 110 is cranked on a hybrid starter generator (HSG) 115 to start operation. An output torque (engine torque; engine power) of the engine 110 is controlled by the controller 150.

The engine clutch 120 is interposed between the engine 110 and the motor 130 to control the power (output torque) of the engine 110. The engine clutch 120 transmits or blocks power (engine power) generated by the engine 110 to a driving wheel (vehicle wheel) through engagement or disengagement.

The motor 130 receives electric power from a battery 135 to generate driving power (motor power) and transmits the power to the driving wheel. The battery 135, which performs a function of supplying electric power necessary to drive the vehicle, is implemented with a high voltage battery. As the motor 130 operates under the control of the controller 150, the output torque (motor torque; motor power) of the motor 130 is adjusted. The motor 130 changes the rotational direction and the revolution per minute (RPM) according to the instruction of the controller 150.

The motor 130 is used as a generator that charges the battery 135 by generating a counter electromotive force in a low state of charge (SOC) or regenerative braking. In addition, the motor 130 may perform a function of cranking the engine 110 in an eco-friendly vehicle such as a hybrid vehicle.

The transmission 140 outputs motor power, or engine power and motor power, to the vehicle wheel (driving wheel) through gear shifting. The transmission 140, which is a double clutch transmission (DCT), includes a first clutch 141, a second clutch 143, and a gearbox 145. The first clutch 141 is directly connected to a first transmission input shaft on which an odd-numbered gear is installed to transmit the power to the first transmission input shaft. The second clutch 143 is directly connected to a second transmission input shaft on which an even-numbered gear is installed to transmit the power to the second transmission input shaft. The gearbox 145 includes an odd-numbered gear such as a first gear, a third gear, or a fifth gear, an even-numbered gear such as a second gear, a fourth gear, and a sixth gear, a first shift actuator, which couples or decouples the odd-numbered gear to or from the first transmission input shaft, and a second gear actuator which couples or decouples the even-numbered gear to or from the second transmission input shaft.

The controller 150 controls shifting of the vehicle. The controller 150 may transmit/receive data to/from in-vehicle electronic control units connected with the controller 150 through a vehicle network. In this case, the vehicle network includes at least one of communication technologies such as a controller area network (CAN), FlexRay, Media Oriented Systems Transport (MOST), Local Interconnect Network (LIN), and/or an Ethernet. In addition, the controller 150 may collect vehicle information through sensors (e.g., a speed sensor and a shift lever position sensor) mounted in the vehicle.

The controller 150 may change the driving mode through engagement or disengagement of the engine clutch 120. The driving mode is classified into an electric vehicle (EV) mode and a hybrid electric vehicle (HEV) mode. The EV mode is a mode of driving the vehicle only using motor power by disengaging the engine clutch 120 to block the engine power. The HEV mode is a mode of driving the vehicle using the engine power and the motor power by engaging the engine clutch 120.

The controller 150 may sense the shifting (changing) of a shift lever position through a shift lever position sensor when a driver manipulates the shift lever while driving. The controller 150 determines LURCH control based on a shift lever holding time and a vehicle speed, when the position of the shift lever is shifted from a D range to an R range (DR shifting), or shifted from the R range to the D range (RD shifting). For example, when the shift lever is DR-shifted by the driver, the controller 150 determines the LURCH control when the shift lever is positioned at the R range (shift lever holding time) for 3 seconds or more and the vehicle speed is 7 kph (4.5 mph) or less.

When the LURCH control is determined, the controller 150 enters a LURCH control mode and maintains clutch torque of a clutch 141 or 143 which is being driven in the transmission 140. In other words, when the shift lever is shifted to the R range while the vehicle is driving forward with the first gear, the processor 150 maintains the clutch torque (that is, the clutch torque before shifting the position of the shift lever) of the first clutch 141 transmitting power to the first transmission input shaft engaged with the first gear. In other words, when the shift lever is shifted to the R range while the vehicle is driving forward with the second gear, the processor 150 maintains the clutch torque of the second clutch 143 transmitting power to the second transmission input shaft engaged with the second gear. The controller 150 maintains the torque of the first clutch 141 or the second clutch 143 when the shift lever is shifted to the D range in the reverse driving (D gear).

The controller 150 changes the motor torque input to the transmission 140 through torque intervention control. The controller 150 maintains the motor torque before shifting the position of the shift lever and reduces the rotational speed of the motor 130, thereby reducing the vehicle speed. In this case, as the controller 150 maintains the motor torque before shifting the position of the shift lever, the gear shifting may be smoothly implemented. The controller 150 changes the motor torque from a '+' torque to a '−' torque or from a '−' torque to a '+' torque when the vehicle speed reaches a preset threshold speed (e.g., 0 kph or 0 mph). In other words the controller 150 changes the driving direction of the vehicle by changing the rotational direction of the motor 130 from the forward direction to the reverse direction or from the reverse direction to the forward direction. Thereafter, the controller 150 accelerates the vehicle speed by increasing the rotational speed of the motor 130.

Figure 2:
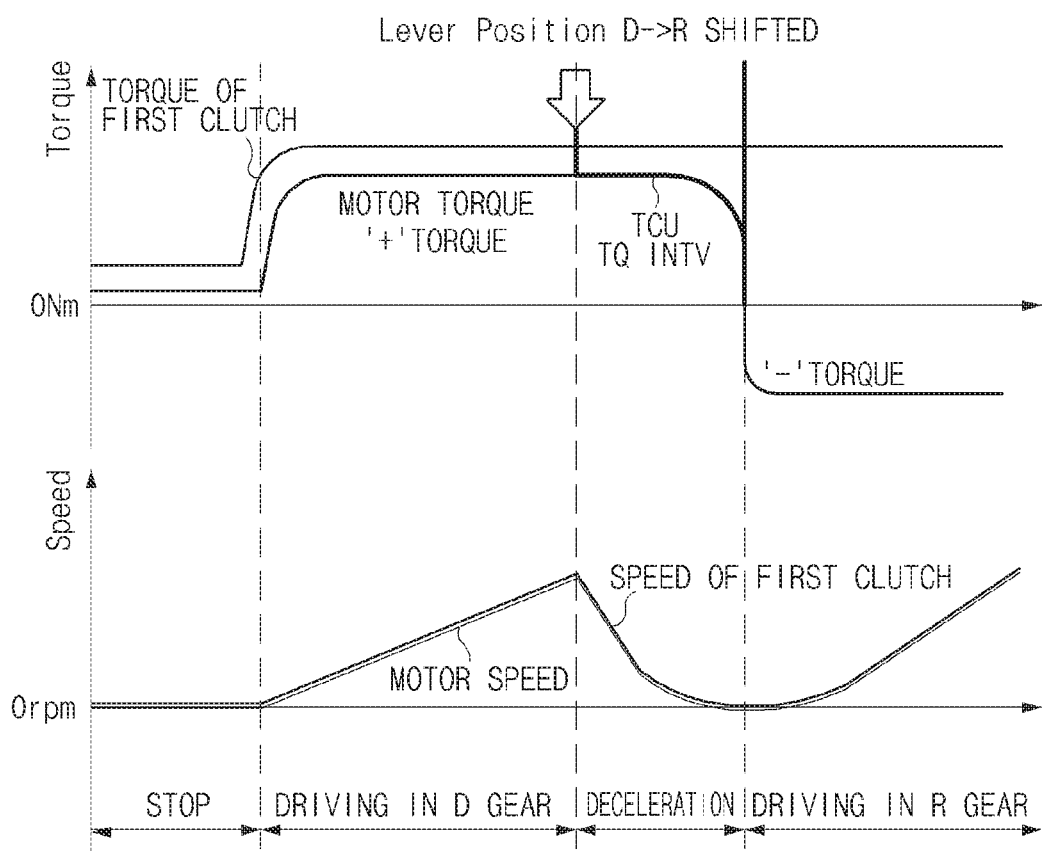
FIG. 2 is a view illustrating DR LURCH control, according to an embodiment of the present disclosure.

FIG. 2 is a view illustrating DR LURCH control, according to an embodiment of the present disclosure.

When the shift lever is shifted from the P range to the D range in the stop state, the controller 150 couples the first gear to the first transmission input shaft and engages and drives the first clutch 141. In addition, the controller 150 drives (rotates) the motor 130 in the forward direction such that the vehicle travels forward. In this case, the controller 150 controls the torque (motor torque) of the motor 130 to '+' torque.

The controller 150 enters the DR LURCH control mode when the shift lever is shifted from the D range to the R range during the forward driving. The controller 150 maintains the clutch torque of the first clutch 141 when entering the DR clutch control mode. In addition, the controller 150 maintains the motor torque of the motor 130 to '+' torque, and decelerates the vehicle speed by controlling a rotational speed (that is, the motor speed) of the motor 130.

When the vehicle speed reaches 0 kph, the controller 150 converts the motor torque to '−' torque through torque intervention control. In other words, the controller 150 changes the rotational direction of the motor 130 from the forward direction to the reverse direction. Thereafter, the controller 150 accelerates the vehicle speed by increasing the rotational speed of the motor 130. In other words, as the motor 130 rotates in the reverse direction, the vehicle travels backward.

Figure 3:
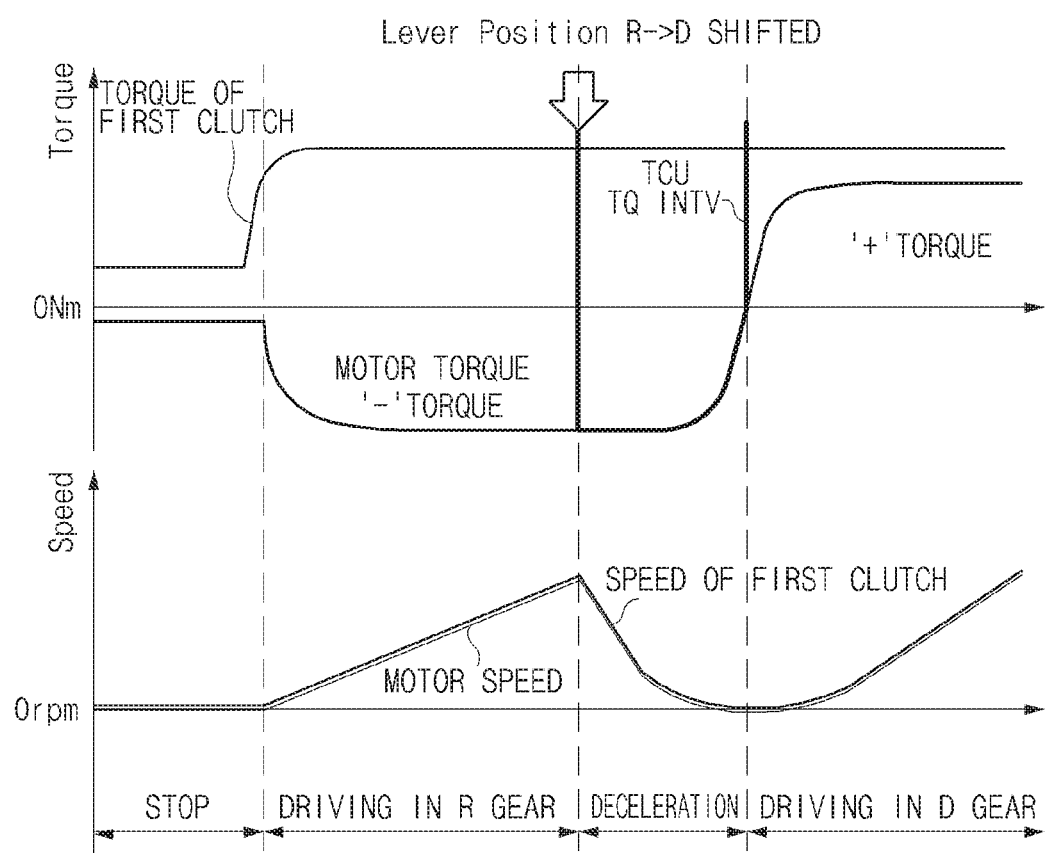
FIG. 3 is a view illustrating RD LURCH control, according to an embodiment of the present disclosure.

FIG. 3 is a view illustrating RD LURCH control, according to an embodiment of the present disclosure.

When the shift lever is shifted from the P range to the R range in the stop state, the controller 150 couples the first gear to the first transmission input shaft and engages and drives the first clutch 141. In addition, the controller 150 drives (rotates) the motor 130 in the backward direction such that the motor 130 travels rearward. The controller 150 controls the motor torque to the '−' torque.

The controller 150 enters the RD LURCH control mode when the shift lever is shifted from the R range to the D range during the reverse driving. The controller 150 maintains the clutch torque of the first clutch 141 when entering the RD clutch control mode. In addition, the controller 150 maintains the motor torque of the motor 130 to '−' torque, and decelerates the vehicle speed by reducing the rotational speed of the motor 130.

When the vehicle speed is reduced to 0 kph, the controller 150 changes the motor torque from '−' torque to '+' torque through torque intervention control. In other words, the controller 150 changes the rotational direction of the motor 130 from the rearward direction to the forward direction. Thereafter, the controller 150 accelerates the vehicle speed by increasing the rotational speed of the motor 130. In other words, as the motor 130 rotates in the forward direction, the vehicle travels forward.

Figure 4:
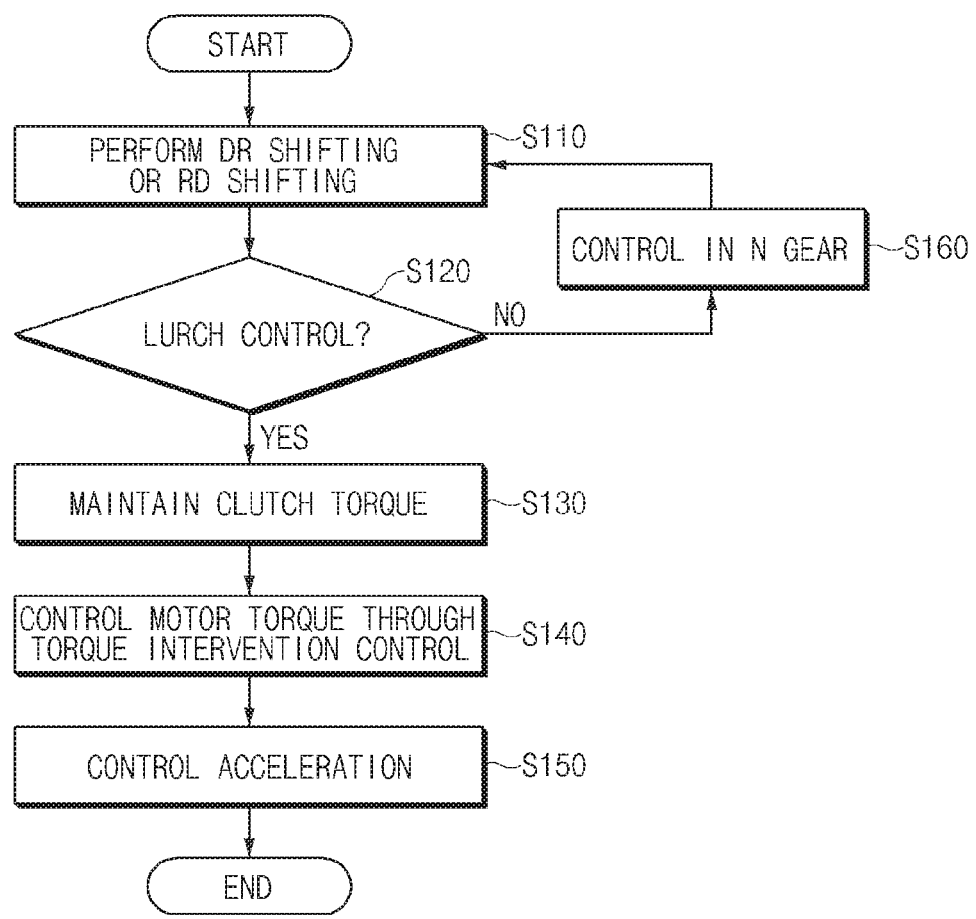
FIG. 4 is a flowchart illustrating a method for controlling shifting of a vehicle, according to an embodiment of the present disclosure.

FIG. 4 is a flowchart illustrating a method for controlling shifting of a vehicle, according to an embodiment of the present disclosure.

Referring to FIG. 4, the controller 150 senses the DR shifting or the RD shifting of the shift lever during driving (S110). When the shift lever is shifted from D range to the R range during forward driving with the first gear or the second gear, the controller 150 senses the DR shifting of the shift lever through the shift lever position sensor. When the vehicle travels rearward with the first gear or the second gear and the shift lever is shifted from R range to the D range, the controller 150 senses the DR shifting of the shift lever through the shift lever position sensor.

When the controller 150 senses the DR shifting or the RD shifting of the shift lever, the controller 150 determines whether the LURCH is controlled (S120). The controller 150 determines whether the holding time (that is, the shift lever holding time) after the DR shifting or the RD shifting of the shift lever is greater than or equal to a specific reference time. In addition, the controller 150 determines whether the vehicle speed is equal to or less than a preset reference speed (e.g., 7 kph). The controller 150 determines the LURCH control when the shift lever holding time is equal to or greater than the reference time and/or when the vehicle speed is equal to or less than the reference speed.

When the LURCH control is determined, the controller 150 maintains the clutch torque of a clutch which is being driven (S130). When the LURCH control is determined, the controller 150 enters a LURCH control mode to maintain the clutch torque of the clutch which is being driven. In other words, the controller 150 maintains the clutch torque of the first clutch 141 or the second clutch 143. For example, when the controller 150 enters a DR LURCH control mode during the forward driving with a second gear, the controller 150 maintains the clutch torque of the second clutch 143. Meanwhile, when the controller 150 enters an RD LURCH control mode during the rearward driving with a first gear, the controller 150 maintains the clutch torque of the first clutch 141.

The controller 150 changes the motor torque through the torque interaction control (S140). The controller 150 maintains a motor torque and reduces a motor speed to reduce a vehicle speed. The controller 150 changes the motor torque from a '+' torque to a '−' torque or from a '−' torque to a '+' torque when the vehicle speed reaches a threshold speed (e.g., 0 kph). In other words, the controller 150 changes the rotational direction of the motor 130 from the forward direction to the reverse direction or from the reverse direction to the forward direction through the torque interaction control.

The controller 150 controls the acceleration of the vehicle by controlling the motor speed after the motor torque is changed (S150). Thereafter, the controller 150 increases the vehicle speed by increasing the rotational speed of the motor 130.

Meanwhile, when the LURCH control is not determined in S120, the controller 150 controls the transmission gear to the neutral (N gear) (S160).

Figure 5:
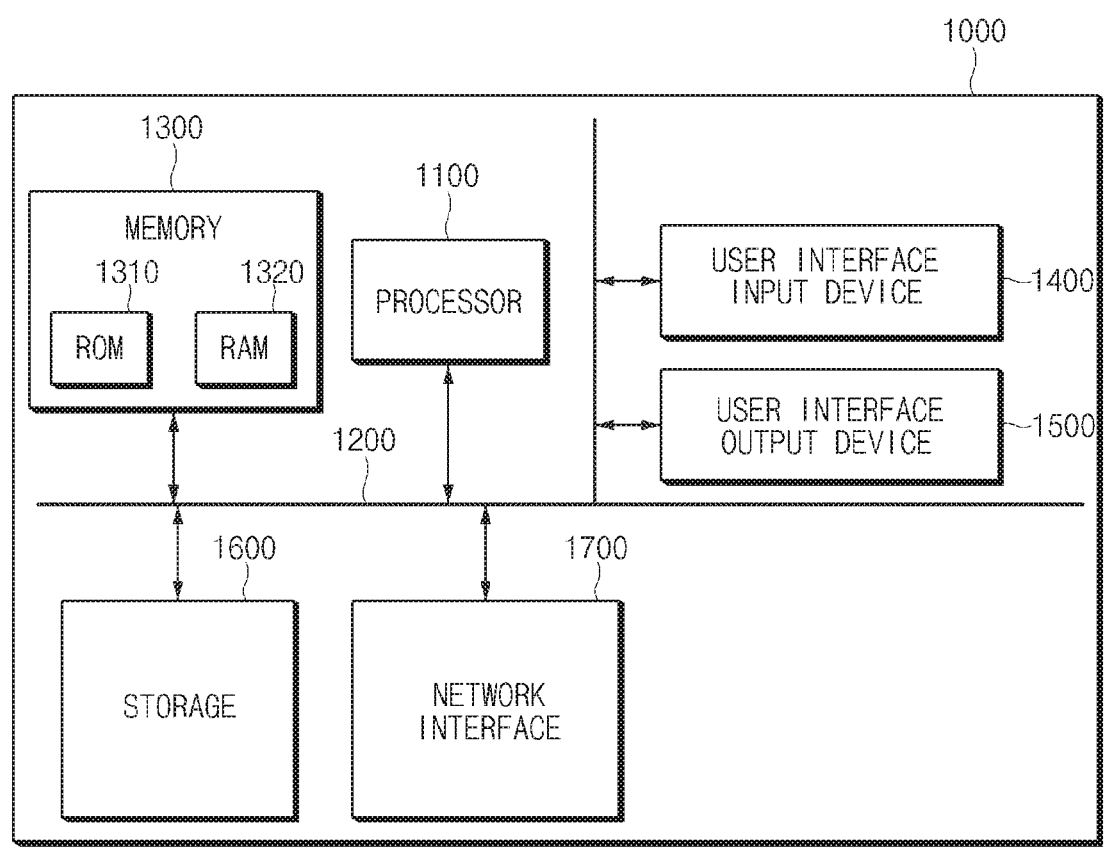
FIG. 5 is a block diagram illustrating a computing system to execute a method for controlling shifting of a vehicle, according to an embodiment of the present disclosure.

FIG. 5 is a block diagram illustrating a computing system to execute a method for controlling shifting of a vehicle, according to an embodiment of the present disclosure.

Referring to FIG. 5, a computing system woo may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only memory (ROM; see 1310) and a random access memory (RAM; see 1320).

Thus, the operations of the methods or algorithms described in connection with the embodiments disclosed in the present disclosure may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor 1100 and storage medium may reside in an application specific integrated circuit (ASIC). The ASIC may reside in a user terminal. Alternatively, the processor 1100 and the storage medium may reside as separate components of the terminal of the user.

As described, according to the present disclosure, DR LURCH or RD LURCH may be rapidly controlled by removing the R gear from the DCT transmission, fuel efficiency may be improved, the weight may be reduced, and manufacturing costs may be reduced.

In addition, according to embodiments of the present disclosure, the shifting between the D gear and the R gear may be performed by using one clutch, which is being driven, without changing the clutch torque.

Further, according to embodiments of the present disclosure, excellent effects may be produced against heating, impact, or shaking because there is absent a clutch clip control. In addition, an impact is not exerted in gear shifting because the gear is not shifted and the clutch torque is not changed.

In addition, according to the present disclosure, since a condition for shifting the gear is not required, a vehicle speed (vehicle velocity) for entrance into LURCH control may be increased more as compared to a conventional technology.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, the exemplary embodiments of the present disclosure are provided to explain the spirit and scope of the present disclosure, but not to limit them, so that the spirit and scope of the present disclosure are not limited by the embodiments. The scope of the present disclosure should be construed on the basis of the accompanying claims, and all the technical ideas within the scope equivalent to the claims should be included in the scope of the present disclosure.

What is claimed is:

1. An apparatus for controlling shifting of a vehicle, the apparatus comprising:
a transmission configured to transmit power generated by a motor to a vehicle wheel; and
a controller configured to control an operation of the transmission, wherein the controller is configured to enter a LURCH control mode when sensing shifting of a shift lever between a D range and an R range during driving to maintain a clutch torque in the transmission, to decrease a vehicle speed by controlling a motor speed, and to shift a gear of the vehicle by changing a motor torque when the vehicle speed reaches a threshold speed.

2. The apparatus of claim 1, wherein the controller is configured to recognize DR shifting of the shift lever through a shift lever position sensor, when a position of the shift lever is shifted from the D range to the R range during forward driving with a first gear or a second gear.

3. The apparatus of claim 1, wherein the controller is configured to recognize RD shifting of the shift lever through a shift lever position sensor, when a position of the shift lever is shifted from the R range to the D range during rearward driving.

4. The apparatus of claim 1, wherein the controller is configured to determine entrance into the LURCH control mode based on a holding time and the vehicle speed after changing a position of the shift lever.

5. The apparatus of claim 4, wherein the controller is configured to maintain a motor torque before changing the position of the shift lever when the vehicle speed is decreased.

6. The apparatus of claim 5, wherein the controller is configured to change a rotational direction of the motor to a direction opposite a current rotational direction through torque intervention control when the vehicle speed reaches the threshold speed.

7. The apparatus of claim 1, wherein the transmission includes a Double Clutch Transmission (DCT) including a first clutch configured to transmit the power to a first transmission input shaft engaged with an odd-numbered gear and a second clutch to transmit the power to a second transmission input shaft engaged with an even-numbered gear.

8. The apparatus of claim 7, wherein the controller is configured to maintain a clutch torque of the first clutch or the second clutch, which is being driven, inside the transmission when entering the LURCH control mode.

9. A method for controlling shifting of a vehicle, the method comprising:
   entering a LURCH control mode when sensing shifting of a shift lever between a D range and an R range during driving;
   maintaining a clutch torque in a transmission when entering the LURCH control mode to decrease a vehicle speed by controlling a motor speed; and
   shifting a gear of the vehicle by changing a motor torque when the vehicle speed reaches a threshold speed.

10. The method of claim 9, wherein entering the LURCH control mode comprises:
    sensing a shift in a position of the shift lever through a shift lever position sensor; and
    determining whether to perform LURCH control based on a holding time and the vehicle speed, after shifting of the position of the shift lever.

11. The method of claim 10, wherein sensing the shift in the position of the shift lever comprises recognizing DR shifting of the shift lever through the shift lever position sensor, when the position of the shift lever is shifted from the D range to the R range during forward driving with a first gear or a second gear.

12. The method of claim 10, wherein sensing the shift in the position of the shift lever comprises recognizing RD shifting of the shift lever through the shift lever position sensor, when a position of the shift lever is shifted from the R range to the D range during rearward driving.

13. The method of claim 9, wherein maintaining the clutch torque to decrease the vehicle speed includes maintaining the motor torque before shifting the position of the shift lever to reduce the motor speed such that the vehicle speed is deceased.

14. The method of claim 9, wherein shifting the gear of the vehicle includes changing a rotational direction of a motor to a direction opposite a present rotational direction through torque intervention control when the vehicle speed reaches the threshold speed.

15. The method of claim 9, further comprising increasing the vehicle speed by accelerating the motor speed after changing the motor torque.

16. A vehicle comprising:
    a vehicle wheel;
    a motor;
    a transmission configured to transmit power generated by the motor to the vehicle wheel; and
    a controller configured to control an operation of the transmission, wherein the controller is configured to enter a LURCH control mode when sensing shifting of a shift lever between a D range and an R range during driving to maintain a clutch torque in the transmission, to decrease a vehicle speed by controlling a motor speed, and to shift a gear of the vehicle by changing a motor torque when the vehicle speed reaches a threshold speed.

17. The vehicle of claim 16, wherein the controller is configured to recognize DR shifting of the shift lever through a shift lever position sensor, when a position of the shift lever is shifted from the D range to the R range during forward driving with a first gear or a second gear.

18. The vehicle of claim 16, wherein the controller is configured to recognize RD shifting of the shift lever through a shift lever position sensor, when a position of the shift lever is shifted from the R range to the D range during rearward driving.

19. The vehicle of claim 16, wherein the controller is configured to determine entrance into the LURCH control mode based on a holding time and the vehicle speed after changing a position of the shift lever.

20. The vehicle of claim 16, wherein the transmission includes a Double Clutch Transmission (DCT) including a first clutch configured to transmit the power to a first transmission input shaft engaged with an odd-numbered gear and a second clutch to transmit the power to a second transmission input shaft engaged with an even-numbered gear.

* * * * *